(No Model.)　　　　　　　　　　　　　　　　　　2 Sheets—Sheet 2.
E. WESTON.
ELECTRICAL MEASURING INSTRUMENT.
No. 522,950.　　　　　　　　　Patented July 10, 1894.
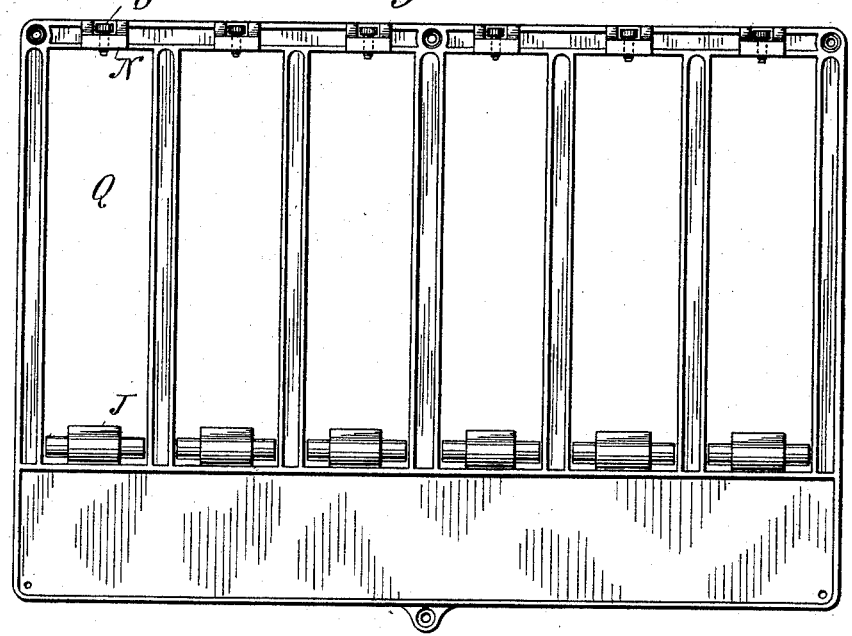
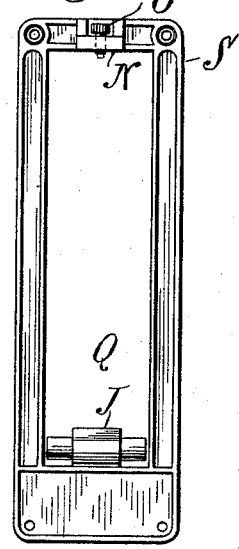
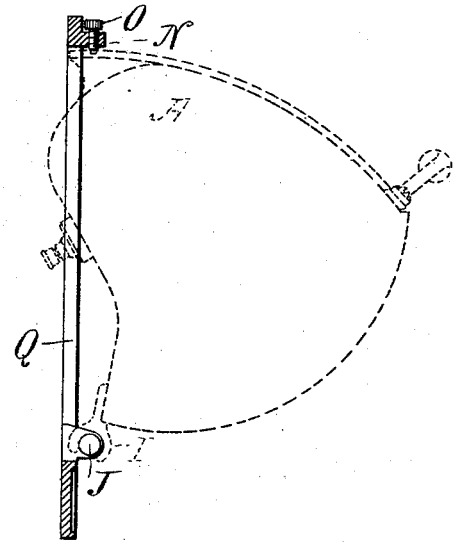
WITNESSES:　　　　　　　　　　　　　　　INVENTOR
  D. N. Hayrood　　　　　　　　　　　　　Edward Weston
  H. P. Moller　　　　　　　　　　　　　　　BY
　　　　　　　　　　　　　　　　　　　　Park Benjamin
　　　　　　　　　　　　　　　　　　　　　his ATTORNEY

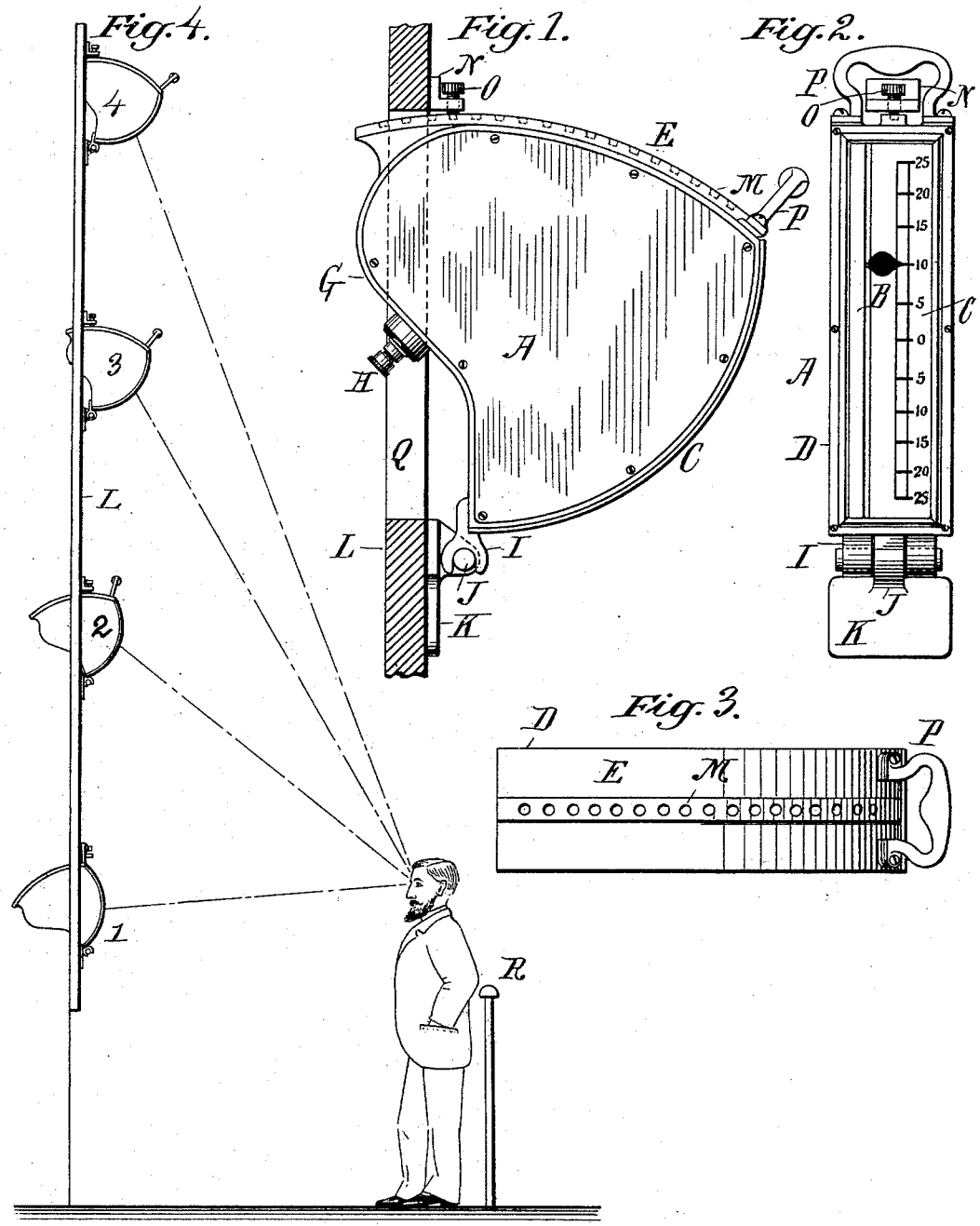

United States Patent Office.

EDWARD WESTON, OF NEWARK, NEW JERSEY.

ELECTRICAL MEASURING-INSTRUMENT.

SPECIFICATION forming part of Letters Patent No. 522,950, dated July 10, 1894.

Application filed February 21, 1894. Serial No. 500,981. (No model.)

*To all whom it may concern:*

Be it known that I, EDWARD WESTON, of Newark, Essex county, New Jersey, have invented a new and useful Improvement in Electrical Measuring Instruments, of which the following is a specification.

The invention relates to electrical measuring instruments used in connection with a switch board, or other like support, on what is known as the "edgewise" system, wherein the scale and index needle instead of being disposed on the face, are arranged on the edge of the instrument. The advantage of this construction is that it enables very many more instruments to be located upon the switch board than would otherwise be practicable.

My invention consists more particularly in the construction of the instrument and its combination with a supporting frame, or with the switchboard so that its position may be varied in order to enable the indications to be conveniently read, and so that it may be held as adjusted.

In the accompanying drawings Figure 1 is a side elevation of the instrument showing the switch board in section. Fig. 2 is an edge or front view. Fig. 3, is a top view. Fig. 4 shows a side view of a switch board with several instruments in place, the said instruments being adjusted so as to present their scales more conveniently to observation. Fig. 5 shows a frame in which the instrument may be disposed. Fig. 6 is a longitudinal section of said frame. Fig. 7 is a face view of a frame adapted to hold several instruments.

Similar letters and figures of reference indicate like parts.

It is well known that when the measuring instruments of a station are placed upon high switch boards, it is exceedingly difficult to read those above the observer's head when the switch board is located in a gallery, or when the space in front of the switch board is so limited as that he cannot stand sufficiently far from it to enable him to see the upper instruments, except at a very sharp angle. In such event not only is the scale difficult to read, owing to the fore shortening, but parallax comes in to render the reading doubtful. I avoid this by the construction and arrangement of the instrument now to be detailed.

The internal mechanism of the instrument A may be of any construction suitable for measurement purposes, and to cause an index or pointer B to move over a suitable scale which is inscribed upon one edge C of the apparatus. The general shape of the instrument is here shown as approximately triangular, the sides as D being flat. The edge C is preferably in the form of a circular arc. The edge E, is likewise in the form of a circular arc struck from the pivot center at J, above which the instrument turns. The edge G may be shaped as desired, but preferably is formed as indicated in the drawings. On said edge G are located the binding posts, one of which is shown at H, whereby the instrument is connected in circuit. At about the angle between the edges C and G the instrument is provided with yokes I, which are received upon the fixed pivot J. Said pivot J extends from each side of a bracket K, which is secured to the switch board L. In the edge E is made a number of recesses M, preferably spaced at regular intervals apart. On the switch board above the edge E is a fixed bracket N having a threaded aperture, through which passes the screw O, the end of said screw being adapted to enter any one of the recesses M on edge E, which may be brought beneath it. Extending from edge E near its angle with edge C is a handle P. It will be obvious from this construction, that the instrument A turns upon the pivot J, and that it may be tilted forward or back by means of handle P, in the opening Q, in the switch board, wall or other support, in which it is received. Also that it may be held in any adjusted position by means of the screw O, entering one of the recesses M. The advantage of this arrangement is shown in Fig. 4. Here the distance to which the observer can retire from the switch board is indicated by the railing at R. This may be for example at the edge of a gallery. It will be apparent that while the line of sight of the observer (indicated by dotted lines) meets the face of the instrument located at 1, at nearly right angles, if said instrument were placed in the position of the instrument 4, the face remaining unchanged in inclination, the line of sight would meet said face at a very sharp angle. But if the instrument is tilted forward as represented at 4, and adjusted in position by the means already described, then plainly the line of sight still meets its face at nearly a right angle, and the same is true of the instruments at 2 and 3, which need not be tilted forward so much. The result is that the observer can see the face of every instrument on the switch board at the most favorable angle. Thus I practically avoid the effects of fore-shortening and parallax, and render it possible to locate the switch board in places where limitations in floor area would make it impossible for the observer to read many of the instruments thereon, unless a ladder or some similar means were used to mount up to them. It is always, however, a great advantage for the attendant at a station to be able to see all his indicators and measuring instruments from his post, and this, the present invention fully secures. Also it will be noted the adjustment of the instruments need be made but once for all, while on the other hand, if it is desired to replace or change them their mode of connection with the switch board allows of their convenient and ready removal.

Instead of mounting the instrument directly upon the switch board, I may arrange it in a frame S, as shown in Fig. 5, the pivot and screw brackets being made integral with this frame. The frame is then secured in front of the opening in the switch board by screw bolts or any other suitable means. So also instead of using a separate frame S for each instrument, I may combine several such frames in a single frame, as represented in Fig. 7, and then attach this multiple frame to the switch board. In this way the number of constructive parts is reduced, and the switch board and its appurtenances are more conveniently put together.

I claim—

1. The combination with a wall or support of an electrical measuring instrument, movable about a pivot on said support, and means for adjusting said instrument so that its face may be disposed at various angles to said support.

2. The combination with a wall or support of an electrical measuring instrument, movable about a pivot disposed on said support at one side of its face, and means whereby said instrument may be adjusted at various angles to the plane of said support.

3. The combination with a vertical wall or support having an opening, of an electrical measuring instrument entering said opening and movable about a pivot at the lower part thereof, and means whereby said instrument may be adjusted at various angles to the plane of said support.

4. The combination with a wall or support of an electrical measuring instrument pivoted thereon, and having its sides disposed at right angles to said support, and means whereby said instrument may be adjusted so that its edge or face may stand at various angles to the plane of said support.

5. The combination with a wall or support having an opening, of an electrical measuring instrument, having its sides disposed at right angles to said support, and entering said opening, and means whereby said instrument may be adjusted so that its edge or face may stand at various angles to the plane of said support.

6. In combination with a wall or support an electrical measuring instrument having parallel flat sides, a means of pivoting said instrument to said support so that it may swing in a plane parallel to that of said sides, and a scale and index on one edge of said instrument.

7. An electrical measuring instrument having sides of polygonal outline, a means of pivoting said instrument so that it may swing from a support in the plane of its sides, one edge of said instrument being of circular outline struck from said pivot center and another edge of said instrument being provided with a scale and index.

8. In combination with a wall or support having an opening Q, the instrument A entering said opening and pivoted at its lower portion, and having an edge E of arc shape struck from said pivot center and an edge C disposed between said pivot and said edge E, provided with a scale and index.

9. In combination with the wall or support having an opening Q, the instrument A entering said opening and pivoted at the lower portion and having an edge E of arc shape struck from said pivot center and provided with recesses M, a screw O on said support adapted to engage with said recesses and an edge C between said edge E and said pivot provided with a scale and index.

10. The combination of a wall or support having openings at different elevations, an electrical measuring instrument as 1, 2, 3, 4, entering each of said openings and pivoted at its lower portion therein, a scale and index on the outer edge or front face of each instrument, and means of independently adjusting each instrument so that said face may stand at an angle to the plane of said wall, whereby lines of sight drawn from a point in front of said wall may meet each of said faces at or nearly at a right angle.

11. The combination of the wall or support having an opening Q and a pivot J and screw O, disposed respectively below and above said opening, the instrument A having yokes I adapted to engage with said pivot J, curved edge E provided with recesses M adapted to receive the screw O, and edge C, provided with a scale and index.

12. The combination of the frame S having an opening Q and a pivot J and screw O disposed respectively below and above said opening, and the instrument A having yokes adapted to engage with said pivot J, curved edge E provided with recesses M adapted to receive the screw O, and edge C provided with a scale and index.

EDWARD WESTON.

Witnesses:
H. R. MOLLER,
M. BOSCH.